(12) United States Patent
Han et al.

(10) Patent No.: US 10,481,741 B2
(45) Date of Patent: Nov. 19, 2019

(54) DISPLAY DEVICE INCLUDING SENSOR SCREEN

(71) Applicant: LG Display Co., Ltd., Seoul (KR)

(72) Inventors: Manhyeop Han, Seoul (KR); Kyoseop Choo, Gyeonggi-do (KR); Buyeol Lee, Gyeonggi-do (KR); Moonbong Song, Seoul (KR); Jiho Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/377,182

(22) Filed: Dec. 13, 2016

(65) Prior Publication Data

US 2017/0344148 A1    Nov. 30, 2017

(30) Foreign Application Priority Data

May 30, 2016  (KR) .................. 10-2016-0066555

(51) Int. Cl.
*G06F 3/044* (2006.01)
*G06F 3/041* (2006.01)
(Continued)

(52) U.S. Cl.
CPC ............ *G06F 3/044* (2013.01); *G06F 3/0416* (2013.01); *G06F 3/04886* (2013.01);
(Continued)

(58) Field of Classification Search
CPC ...... G06F 3/0416; G06F 3/0412; G06F 3/044; G06F 3/04886; G06F 2203/0338;
(Continued)

(56) References Cited

U.S. PATENT DOCUMENTS 8,564,314 B2    10/2013  Shaikh et al.
9,158,958 B2 *  10/2015  Wickboldt ......... G06K 9/00026
(Continued)

FOREIGN PATENT DOCUMENTS

| CN | 104079718 A | 10/2014 |
|----|-------------|---------|
| KR | 10-1432988 B1 | 8/2014 |
| KR | 10-2016-0043217 A | 4/2016 |

OTHER PUBLICATIONS

Extended European Search Report dated Jul. 7, 2017, for corresponding European Patent Application No. 16207001.5.
(Continued)

*Primary Examiner* — Bryan Earles
(74) *Attorney, Agent, or Firm* — Morgan, Lewis & Bockius LLP

(57) ABSTRACT

A display device including a sensor screen having a touch recognition function and a fingerprint recognition function is disclosed. The display device includes a display panel having a first display area and a second display area that are adjacent to each other, a first touch sensor being disposed in the first display area, and a sensor screen having a first transparent substrate and a second transparent substrate that are sequentially disposed on the display panel, and a fingerprint sensor and a second touch sensor that are disposed between the first transparent substrate and the second transparent of the sensor screen corresponding to the second display area of the display panel.

16 Claims, 12 Drawing Sheets

(51) Int. Cl.
*G06K 9/00* (2006.01)
*G06F 3/0488* (2013.01)
*G09G 3/00* (2006.01)

(52) U.S. Cl.
CPC .... *G06K 9/0002* (2013.01); *G06F 2203/0338* (2013.01); *G06F 2203/04103* (2013.01); *G06K 9/00013* (2013.01); *G09G 3/00* (2013.01)

(58) Field of Classification Search
CPC . G06F 2203/04103; G06F 2203/04108; G06F 2203/04112; G06K 9/00013; G06K 9/0002
See application file for complete search history.

(56) References Cited

U.S. PATENT DOCUMENTS

| | | | |
|---|---|---|---|
| 9,323,393 B2* | 4/2016 | Djordjev | G06K 9/0002 |
| 2010/0194707 A1 | 8/2010 | Hotelling et al. | |
| 2010/0245283 A1* | 9/2010 | Lee | G06F 3/0416 |
| | | | 345/174 |
| 2011/0102567 A1* | 5/2011 | Erhart | G06K 9/00026 |
| | | | 348/77 |
| 2011/0267298 A1 | 11/2011 | Erhart et al. | |
| 2012/0044195 A1* | 2/2012 | Nakanishi | G06F 3/0412 |
| | | | 345/174 |
| 2012/0182253 A1* | 7/2012 | Brosnan | G06F 3/0416 |
| | | | 345/174 |
| 2013/0069905 A1* | 3/2013 | Krah | G06F 3/0418 |
| | | | 345/174 |
| 2013/0135247 A1 | 5/2013 | Na et al. | |
| 2013/0257790 A1* | 10/2013 | Chen | G06F 3/0418 |
| | | | 345/174 |
| 2013/0265137 A1* | 10/2013 | Nelson | G06K 9/0002 |
| | | | 340/5.82 |
| 2013/0307818 A1 | 11/2013 | Pope et al. | |
| 2014/0129843 A1 | 5/2014 | Shi et al. | |
| 2014/0270414 A1* | 9/2014 | Slaby | G06K 9/00013 |
| | | | 382/124 |
| 2014/0359756 A1* | 12/2014 | Alameh | G06F 21/32 |
| | | | 726/19 |
| 2016/0232395 A1 | 8/2016 | Han et al. | |
| 2016/0253540 A1* | 9/2016 | Han | G06K 9/00 |
| | | | 382/124 |
| 2017/0161535 A1* | 6/2017 | Lin | G06K 9/0002 |

OTHER PUBLICATIONS

First Notification of Office Action, dated May 13, 2019, for corresponding Chinese Patent Application No. 201611154071.2. Note: US 2014/0359756, US 2013/0265137, and US 2013/0257790 cited therein are already of record.

* cited by examiner

DISPLAY DEVICE INCLUDING SENSOR SCREEN

This application claims the benefit of priority under 35 U.S.C. § 119(a) to Republic of Korean Patent Application No. 10-2016-0066555 filed on May 30, 2016, the entire contents of which is incorporated herein by reference for all purposes as if fully set forth herein.

BACKGROUND

Field of the Invention

The present disclosure relates to a display device including a sensor screen, and more particularly, to a display device including a sensor screen having a touch recognition function and a fingerprint recognition function.

Discussion of the Related Art

With the development of computer technology, computer based systems, that can be applied to various utilities such as notebook computers, tablet personal computers (PCs), smart phones, personal digital assistants (PDAs), automated teller machines (ATMs), and information systems, have been developed. In general, computer based systems store various data including private information such as secret business information and personal information related to private affairs. Thus, strong security mechanisms are typically desired to protect such information.

To this end, fingerprint sensors have been developed to strengthen security by performing registration or certification of systems using fingerprints of human beings.

The fingerprint sensor is a sensor capable of sensing fingerprints of human beings. A fingerprint sensor can be classified into an optical fingerprint sensor and a capacitive fingerprint sensor.

The optical fingerprint sensor is based on the principle that a light source, such as a light emitting diode (LED), emits light and the light reflected from ridges and valleys of a fingerprint is sensed through a CMOS image sensor. However, problems in this field concern an increase in size due to the use of LEDs and a rise in the product cost due to the use of expensive light source.

The capacitive fingerprint sensor utilizes a difference of electric charges charged between ridges and valleys of the fingerprint contacted thereto.

U.S. Patent Publication No. 2013/0307818 published on Nov. 21, 2013 and entitled "Capacitive Sensor Packaging" describes a capacitive fingerprint sensor of a related art.

The published capacitive fingerprint sensor is configured as an assembly form coupled with a particular push button. The capacitive fingerprint sensor includes a silicon wafer, on which a circuit for measuring a capacitance between a fingerprint (ridges and valleys) and a capacitive plate is printed.

In general, the capacitive fingerprint sensor described in US Patent Publication No. 2013/0307818 may need a high resolution sensor array and an integrated circuit (IC) for the fingerprint recognition processing because the fingerprint's ridges and valleys have a very minute size of about 300 μm to 500 μm. To this end, the capacitive fingerprint sensor utilizes the silicon wafer for integrating the IC with the sensor array.

However, when the IC and the high resolution sensor array are integrated using the silicon wafer, the small-sized packaged fingerprint sensor has to be embedded in a push button (e.g., a home key of a smart phone) or separately attached to a back surface of the push button because the silicon wafer is opaque and has a limit to an increase in size. Thus, an assembly configuration for coupling the fingerprint sensor with the push button is necessary, thereby leading to an increase in size (due to a non-display area and a thickness) and a rise in the product cost.

To address the above-described problems, a technology has been developed to use an area of a touch sensor screen as a fingerprint identification area. The technology is described in U.S. Pat. No. 8,564,314 issued on Oct. 22, 2013 and entitled "Capacitive touch sensor for identifying a fingerprint" and Korean Patent No. 10-1432988 issued on Aug. 18, 2014 and entitled "Fingerprint recognition integrated type capacitive touch screen".

FIG. 1 is a plan view schematically illustrating an arrangement of driving electrodes and sensing electrodes of a capacitive sensing panel shown in FIG. 5 of U.S. Pat. No. 8,564,314. FIG. 2 is a plan view illustrating configuration of a fingerprint recognition integrated type capacitive touch screen shown in FIG. 3 of Korean Patent No. 10-1432988.

Referring to FIG. 1, a capacitive touch sensor for identifying a fingerprint includes a touch sensor 403 including touch driving electrodes 401($x$) and touch sensing electrodes 401($y$) and a fingerprint sensor 405 including fingerprint driving electrodes 405($x$) and fingerprint sensing electrodes 405($y$). In the capacitive touch sensor for identifying the fingerprint, because the fingerprint sensor 405 is separately disposed in a portion of a screen area, problems posed may include a non-touch of the fingerprint sensor 405 or a reduction in a touch performance around the fingerprint sensor 405.

Referring to FIG. 2, a fingerprint recognition integrated type capacitive touch screen includes a touch panel 110, electrode connection lines 120, and a touch controller 130. The touch panel 110 includes fine channels 113 formed by a combination of first channel electrodes 111 (one of Tx and Rx) and second channel electrodes 112 (the other of Tx and Rx) crossing each other. The fine channels 113 are configured such that the fine channels 113 of a remaining area except an area of fingerprint recognition sensors 114 form a plurality of groups each serving as a touch group channel 115 for sensing a touch signal, and the fine channels 113 corresponding to the area of the fingerprint recognition sensors 114 each serve as a fingerprint recognition channel 116. However, this fingerprint recognition integrated type capacitive touch screen may greatly increase a mutual capacitance between touch channels because of the fine channels 113 (i.e., the touch channels) serving as the touch group channels 115. Because an increase in the mutual capacitance reduces sensitivity of the touch sensor, a touch operation may not be recognized when the touch operation is generated.

SUMMARY

Accordingly, the present invention is directed to a display device including sensor screen that substantially obviates one or more of the problems due to limitations and disadvantages of the related art.

An object of the present disclosure is to provide a display device having a main display area and a sub-display area and including a sensor screen having a fingerprint sensor and a touch sensor in the sub-display area.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device comprises a display panel including a first display area and a second display area that are adjacent to each other, a first touch sensor being disposed in the first display area; and a sensor screen including a first transparent substrate and a second transparent substrate that are sequentially disposed on the display panel, and a fingerprint sensor and a second touch sensor that are disposed between the first transparent substrate and the second transparent substrate at a location corresponding to the second display area of the display panel.

The fingerprint sensor is disposed in a portion of the sensor screen corresponding to the second display area to recognize a fingerprint input and a touch input, and the second touch sensor is disposed in a remaining portion of the sensor screen corresponding to the second display area.

The first touch sensor is configured as one of a self-capacitive touch sensor and a mutual capacitance touch sensor using a common electrode of the display panel.

A thickness of the first transparent substrate is greater than a thickness of the second transparent substrate.

In another aspect, a display device comprises a display panel including a first display area and a second display area that are adjacent to each other; and a sensor screen including a first transparent substrate and a second transparent substrate that are sequentially disposed on the display panel, a first touch sensor disposed between the first transparent substrate and the second transparent substrate or between the first transparent substrate and the display panel at a location corresponding to the first display area of the display panel, and a fingerprint sensor and a second touch sensor that are disposed between the first transparent substrate and the second transparent substrate at a location corresponding to the second display area of the display panel.

The fingerprint sensor is disposed in a portion of the sensor screen corresponding to the second display area to recognize a fingerprint input and a touch input, and the second touch sensor is disposed in a remaining portion of the sensor screen corresponding to the second display area.

A thickness of the first transparent substrate is greater than a thickness of the second transparent substrate.

The fingerprint sensor includes a plurality of first fingerprint touch electrodes arranged in a first direction and a plurality of second fingerprint touch electrodes that is insulated from the plurality of first fingerprint touch electrodes and is arranged in a second direction crossing the first direction.

A second flexible circuit board, on which a touch integrated circuit connected to the first touch sensor is mounted, is disposed between the first transparent substrate and the second transparent substrate, or the first transparent substrate and the display panel corresponding to an outside of the first display area of the display panel, and wherein a third flexible circuit board, on which a fingerprint touch integrated circuit is mounted, is disposed between the first transparent substrate and the second transparent substrate corresponding to an outside of the second display area of the display panel.

The fingerprint touch integrated circuit includes: a switching block including a plurality of switching elements that is controlled in response to a touch enable signal and a fingerprint enable signal having opposite polarities and outputs a plurality of sensing signals transmitted from the plurality of second fingerprint touch electrodes or outputs an integrated sensing signal of the plurality of sensing signals; a first integration block including first integrators that receive the plurality of sensing signals supplied from the switching block; a second integration block including a second integrator that receives the integrated sensing signal supplied from the switching block; a first analog-to-digital converter including fingerprint analog-to-digital converters that receive outputs of the first integrators and perform an analog-to-digital conversion on the outputs; and a second analog-to-digital converter including a touch analog-to-digital converter that receives an output of the second integrator and performs an analog-to-digital conversion on the output.

In yet another aspect, a display device comprises a display panel including a first display area and a second display area that are adjacent to each other; and a sensor screen including a first transparent substrate, a transparent film, and a second transparent substrate that are sequentially disposed on the display panel, a first touch sensor disposed between the second transparent substrate and the transparent film or between the transparent film and the first transparent substrate at a location corresponding to the first display area of the display panel, and a fingerprint sensor and a second touch sensor that are disposed between the second transparent substrate and the transparent film at a location corresponding to the second display area of the display panel.

The fingerprint sensor is disposed in a portion of the sensor screen corresponding to the second display area to recognize a fingerprint input and a touch input, and the second touch sensor is disposed in a remaining portion of the sensor screen corresponding to the second display area.

A thickness of the first transparent substrate is greater than a thickness of the second transparent substrate.

The fingerprint sensor includes a plurality of first fingerprint touch electrodes arranged in a first direction and a plurality of second fingerprint touch electrodes that is insulated from the plurality of first fingerprint touch electrodes and is arranged in a second direction crossing the first direction.

A second flexible circuit board, on which a touch integrated circuit connected to the first touch sensor is mounted, is disposed between the first transparent substrate and the transparent film, or the second transparent substrate and the transparent film corresponding to an outside of the first display area of the display panel. A third flexible circuit board, on which a fingerprint touch integrated circuit is mounted, is disposed between the second transparent substrate and the transparent film corresponding to an outside of the second display area of the display panel.

The fingerprint touch integrated circuit includes a switching block including a plurality of switching elements that is controlled in response to a touch enable signal and a fingerprint enable signal having opposite polarities and outputs a plurality of sensing signals transmitted from the plurality of second fingerprint touch electrodes or outputs an integrated sensing signal of the plurality of sensing signals; a first integration block including first integrators that receive the plurality of sensing signals supplied from the switching block; a second integration block including a second integrator that receives the integrated sensing signal supplied from the switching block; a first analog-to-digital converter including fingerprint analog-to-digital converters that receive outputs of the first integrators and perform an analog-to-digital conversion on the outputs; and a second analog-to-digital converter including a touch analog-to-digital converter that receives an output of the second integrator and performs an analog-to-digital conversion on the output.

The fingerprint touch integrated circuit supplies a driving voltage for a touch recognition and a fingerprint recognition to the plurality of first fingerprint touch electrodes. The fingerprint touch integrated circuit senses the plurality of second fingerprint touch electrodes and recognizes a touch input and a fingerprint input.

In still yet another aspect, a display device comprises a display panel including a first display area and a second display area that are adjacent to each other, a first touch sensor being disposed in the first display area; and a sensor screen including a first transparent substrate disposed on the display panel, and a fingerprint sensor and a second touch sensor that are disposed on the first transparent substrate at a location corresponding to the second display area of the display panel.

The display device further includes a second transparent substrate disposed on the first transparent substrate. The fingerprint sensor and the second touch sensor are disposed between the first transparent substrate and the second transparent substrate.

The fingerprint sensor is disposed in a portion of the sensor screen corresponding to the second display area to recognize a fingerprint input and a touch input, and the second touch sensor is disposed in a remaining portion of the sensor screen corresponding to the second display area.

In the display device including the sensor screen according to embodiments, rigidity of the display panel when the two transparent substrates are disposed on the display panel can further increase, compared to when one transparent substrate having the same thickness as a sum of thicknesses of the two transparent substrates is disposed on the display panel. Hence, the display panel can be protected from an external impact.

Further, because the fingerprint sensor is disposed between the two transparent substrates, the fingerprint sensor can be disposed closer to a finger touch position than when one transparent substrate is disposed. Hence, a fingerprint recognition rate can increase.

In embodiments, the touch electrodes may be formed in an area other than a fingerprint sensing area, and the first fingerprint touch electrodes may be commonly used for the fingerprint sensing and the touch sensing. Thus, because both the fingerprint recognition and the touch recognition can be performed, the display device according to embodiments can perform a multi-function.

Further, because the fingerprint sensor is disposed in the display area, a fingerprint of a user can be sensed at an exact location of the fingerprint sensor displayed on the display area regardless of an environment, such as time (e.g., night) and place (e.g., dark place). Hence, the accuracy of the fingerprint sensing can increase.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. Detailed description of known arts will be omitted if it is determined that the arts can mislead the embodiments of the invention. Names of the respective elements used in the following explanations are selected only for convenience of writing the specification and may be thus different from those used in actual products.

In the following description, "first display area" is a main display part of a display device and means "a main display area" capable of sensing a touch; "second display area" is an auxiliary display part, in which a selection icon, etc. are displayed, and means "a sub-display area" capable of sensing a fingerprint input and a touch input; and "fingerprint touch area" means an area that is positioned in the second display area and is able to perform both fingerprint recognition and touch recognition.

Further, "common electrode" means a touch electrode serving as common electrode that serves as a driving electrode and a touch sensing electrode of a touch sensor during a touch sensing period, in which a touch input of the first display area of the display device is sensed, and serves as a common electrode during a display period, in which information is displayed on the first display area.

Further, "display touch integrated circuit (IC)" means an integrated IC of a display IC for displaying information on the first display area of the display device and a touch IC for sensing a touch of the first display area.

Further, "fingerprint touch IC" means an integrated IC of a touch IC for sensing a touch input of the second display area of the display device and a fingerprint IC for sensing a fingerprint of the second display area.

Further, "fingerprint touch sensor" is interpreted to include a touch sensor and a fingerprint sensor disposed in the second display area of the display device, and "fingerprint sensor" is interpreted to be able to perform both fingerprint recognition and touch recognition.

A display device including a sensor screen according to a first example embodiment is described below with reference to FIGS. 3 and 4.

Figure 1:
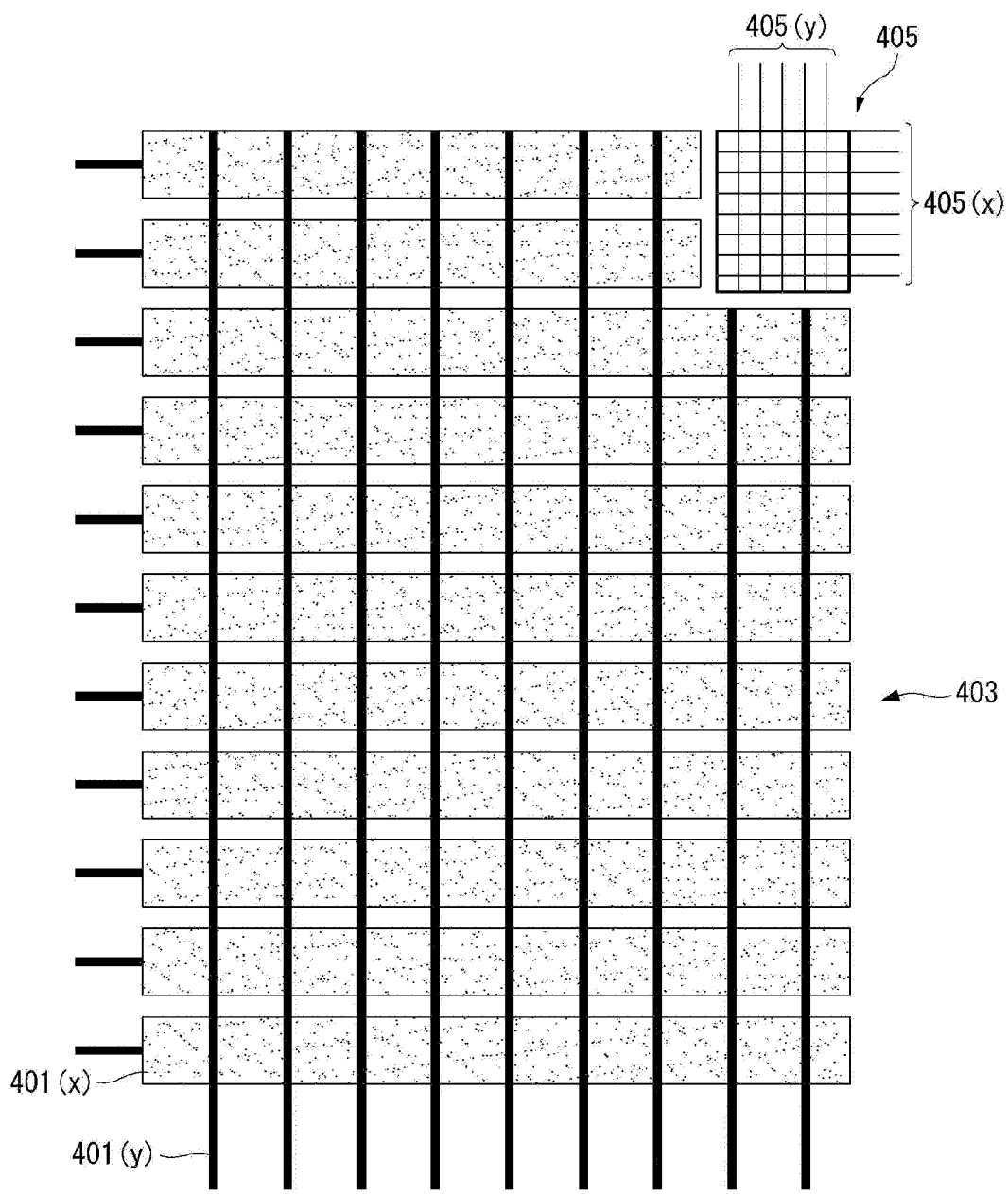
FIG. 1 is a plan view schematically illustrating an arrangement of driving electrodes and sensing electrodes of a capacitive sensing panel of a related art.
Figure 2:
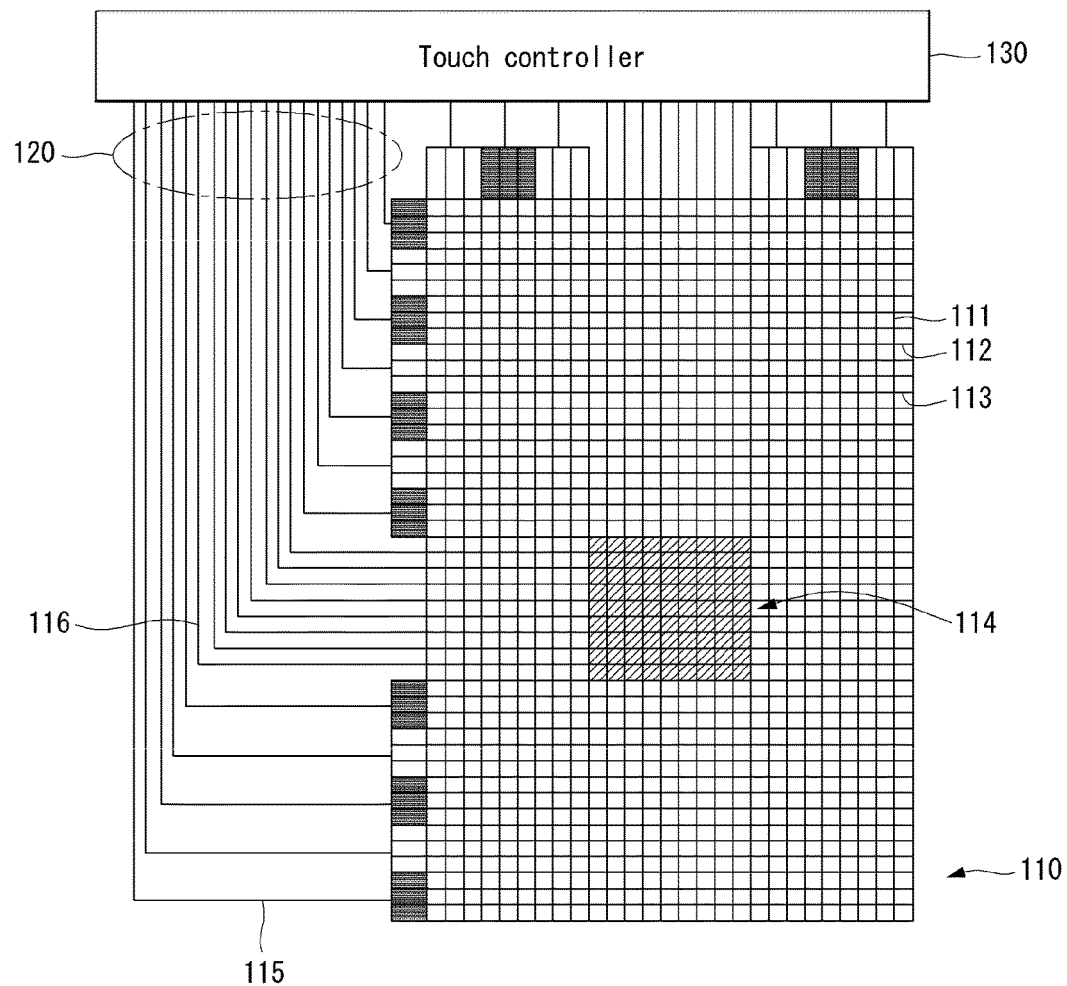
FIG. 2 is a plan view illustrating configuration of a fingerprint recognition integrated type capacitive touch screen of a related art.
Figure 3:
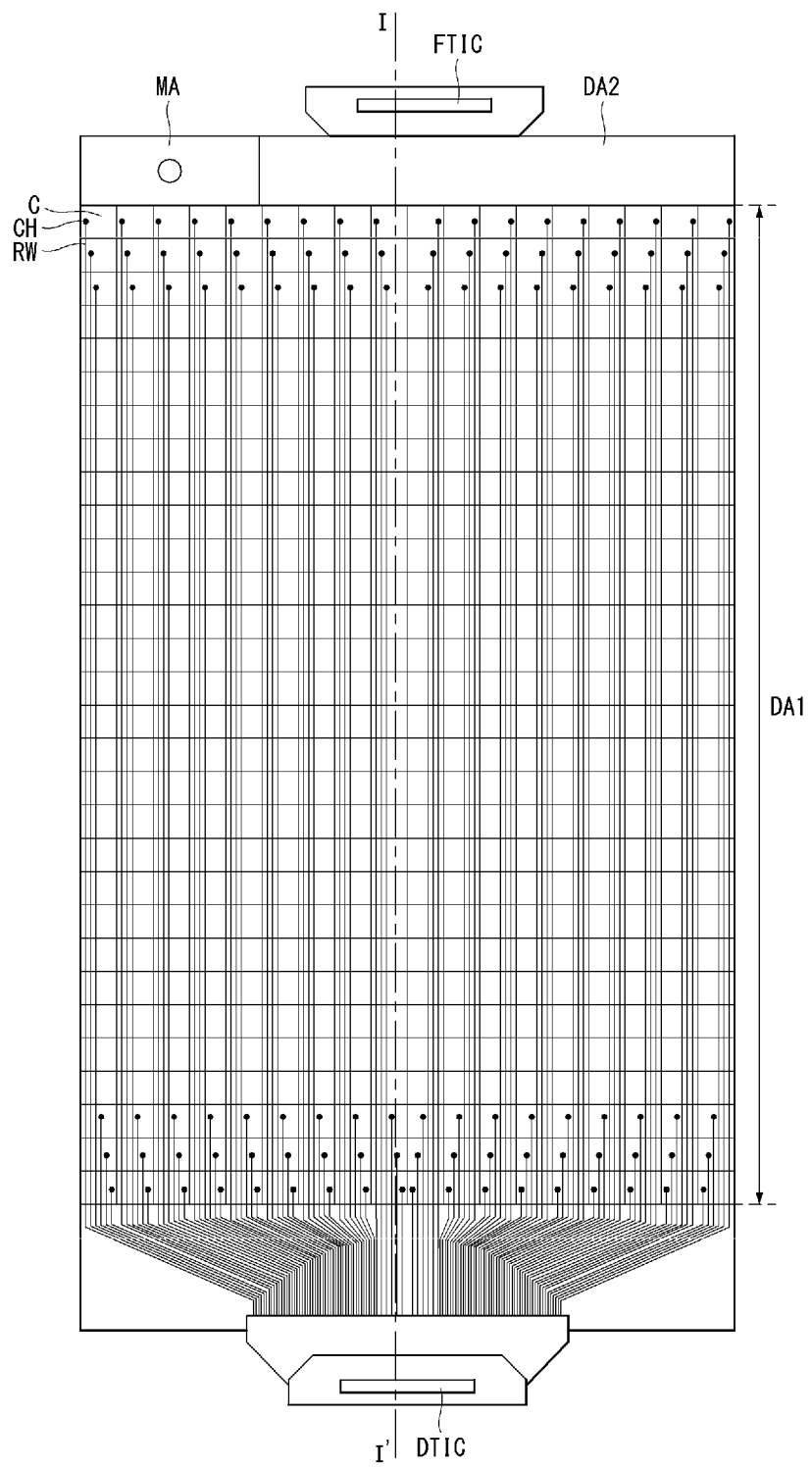
FIG. 3 is a plan view illustrating a display device including a sensor screen according to a first example embodiment.

FIG. 3 is a plan view illustrating a display device including a sensor screen according to a first example embodiment. FIG. 4 is a cross-sectional view taken along line I-I' of FIG. 3.

Figure 4:
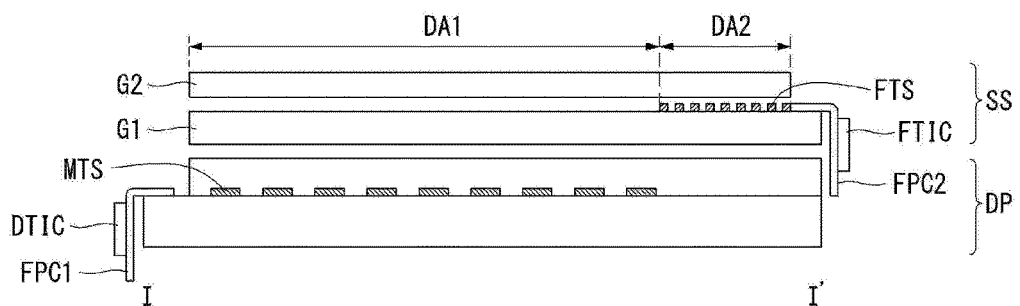
FIG. 4 is a cross-sectional view taken along line I-I' of FIG. 3.

Referring to FIGS. 3 and 4, a display device including a sensor screen according to a first example embodiment includes a display panel DP and a sensor screen SS disposed on the display panel DP.

The display panel DP includes a first display area DA1 and a second display area DA2 that are positioned adjacent to each other, and a module assembly MA in which a module such as a camera may be installed.

A first flexible circuit board FPC1, on which a display touch IC DTIC for a display drive and a touch recognition of the first display area DA1 is mounted, is attached to the outside of the first display area DA1. A second flexible circuit board FPC2, on which a fingerprint touch IC FTIC for a fingerprint recognition and a touch recognition of the second display area DA2 is mounted, is attached to the outside of the second display area DA2.

In other embodiments, the display touch IC DTIC may simultaneously serve as the fingerprint touch IC FTIC for the fingerprint recognition and the touch recognition as well as the display drive and the touch recognition.

The display panel DP may use a display panel of a flat panel display, such as a liquid crystal display (LCD), a field emission display (FED), a plasma display panel (PDP), an organic light emitting diode (OLED) display, and an electrophoresis display (EPD). Other display panels may be used.

The display panel DP includes first touch sensors MTS capable of sensing a touch input of the first display area DA1. The first touch sensors MTS are connected to the display touch IC DTIC.

For example, the first touch sensor MTS may be configured as a self-capacitive touch sensor or a mutual capacitance touch sensor using a common electrode of the display panel DP. FIG. 3 illustrates an example where first routing wires RW are respectively connected to divided common electrodes C of the display panel DP to form the first touch sensor MTS implemented as the self-capacitive touch sensor. In the embodiment disclosed herein, one frame period may be time-divided into a display period and a touch sensing period. The self-capacitive touch sensor serves as a common electrode during the display period and serves as a touch electrode during the touch sensing period.

FIG. 3 illustrates an example where a self-capacitive touch sensor is configured using the common electrode C of the display panel DP. Embodiments are not limited thereto. For example, embodiments may use the first touch sensor MTS configured as a mutual capacitance touch sensor by dividing the common electrode C of the display panel DP in horizontal and vertical directions and connecting the divided common electrodes to one another in the horizontal and vertical directions. Since such a touch sensor integrated (or embedded) type display device is already known in U.S. Patent Publication No. 2010/0194707 published on Aug. 5, 2010, etc., a further description may be briefly made or may be entirely omitted.

The sensor screen SS shown in FIG. 4 includes a first transparent substrate G1 and a second transparent substrate G2 that are sequentially disposed on the display panel DP. The first and second transparent substrates G1 and G2 may be made of a transparent material, for example, tempered glass or hard-coated high-hardness plastic, etc.

The first transparent substrate G1 may have a first thickness, and the second transparent substrate G2 may have a second thickness less than the first thickness. The second thickness of the second transparent substrate G2 may be set to several μm to about 0.3 mm. When the second thickness of the second transparent substrate G2 is less than several μm, rigidity of the second transparent substrate G2 may not be sufficiently secured. Hence, a fingerprint sensor formed under the second transparent substrate G2 may not be sufficiently protected. When the second thickness of the second transparent substrate G2 exceeds 0.3 mm, a fingerprint recognition rate may decrease.

The first and second transparent substrates G1 and G2 may be attached to each other using a transparent material having a good adhesive strength and durability, for example, an optical clear adhesive (OCA) or an optical clear resin (OCR). The first transparent substrate G1 and the display panel DP may also be attached to each other using the OCA or the OCR.

Rigidity of the display panel DP when the two transparent substrates G1 and G2 are disposed on the display panel DP may further increase, compared to when one transparent substrate having the same thickness as a sum of the thicknesses of the two transparent substrates G1 and G2 is disposed on the display panel DP. Hence, the display panel DP can be protected from an external impact. Further, because the fingerprint sensor may be disposed between the two transparent substrates G1 and G2, the fingerprint sensor may be disposed closer to a finger touch position than when one transparent substrate is disposed. Hence, the fingerprint recognition rate can increase.

A fingerprint touch sensor FTS is disposed on the first transparent substrate G1 opposite the second transparent substrate G2 at a location corresponding to the second display area DA2 of the display panel DP. The fingerprint touch sensor FTS is connected to the fingerprint touch IC FTIC.

The fingerprint touch sensor FTS may include a fingerprint sensor disposed in a portion of the sensor screen SS corresponding to the second display area DA2 of the display panel DP and a plurality of touch sensors disposed in a remaining portion of the sensor screen SS corresponding to the second display area DA2 of the display panel DP. The fingerprint sensor may be used as a touch sensor. Configuration of the fingerprint touch sensor FTS is described in detail with reference to FIGS. 11 and 12.

Next, a display device including a sensor screen according to a second example embodiment is described with reference to FIGS. 5 to 9.

Figure 5:
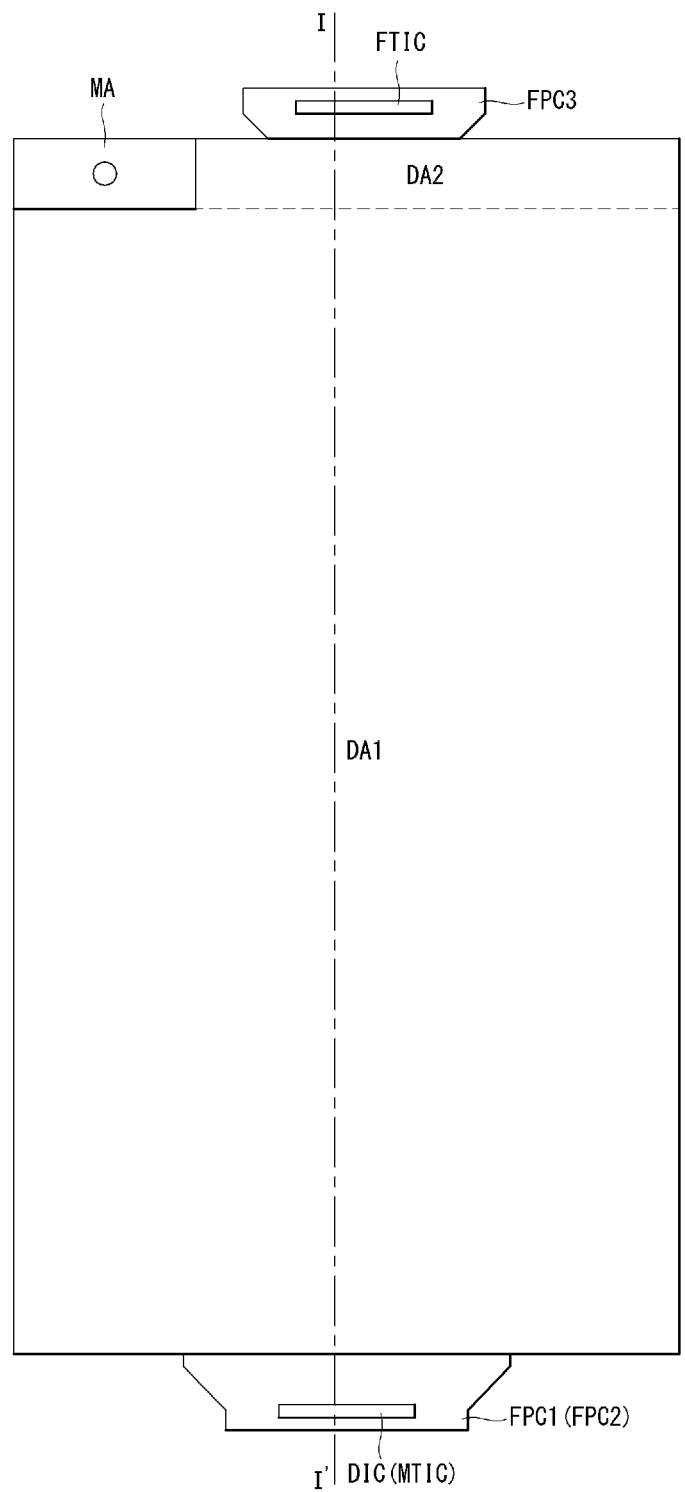
FIG. 5 is a plan view illustrating a display device including a sensor screen according to a second example embodiment.
Figure 6:
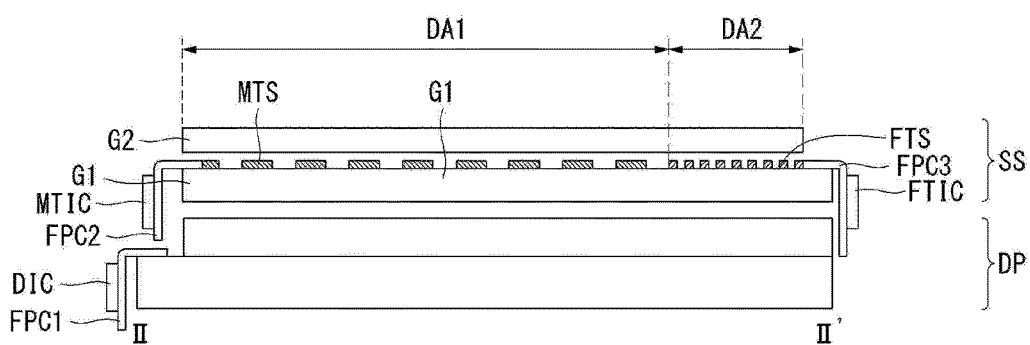
FIG. 6 is a cross-sectional view illustrating a first example of a second example embodiment taken along line II-II' of FIG. 5.
Figure 7:
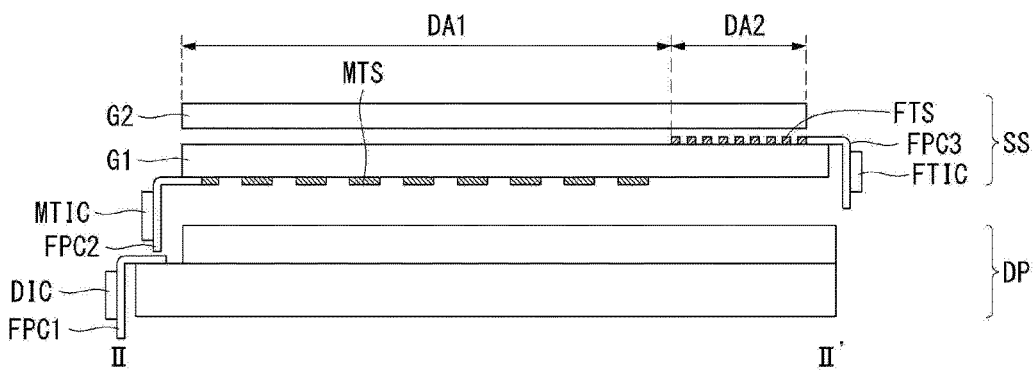
FIG. 7 is a cross-sectional view illustrating a second example of a second example embodiment taken along line II-II' of FIG. 5.
Figure 8:
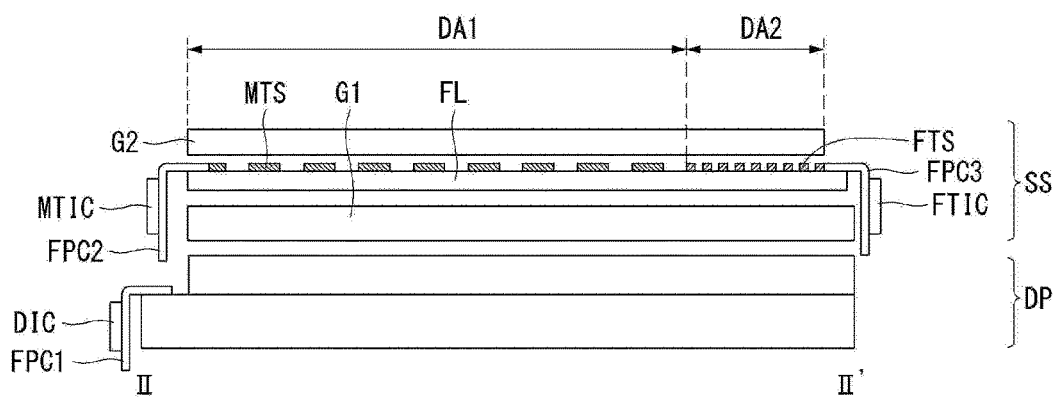
FIG. 8 is a cross-sectional view illustrating a third example of a second example embodiment taken along line II-II' of FIG. 5.
Figure 9:
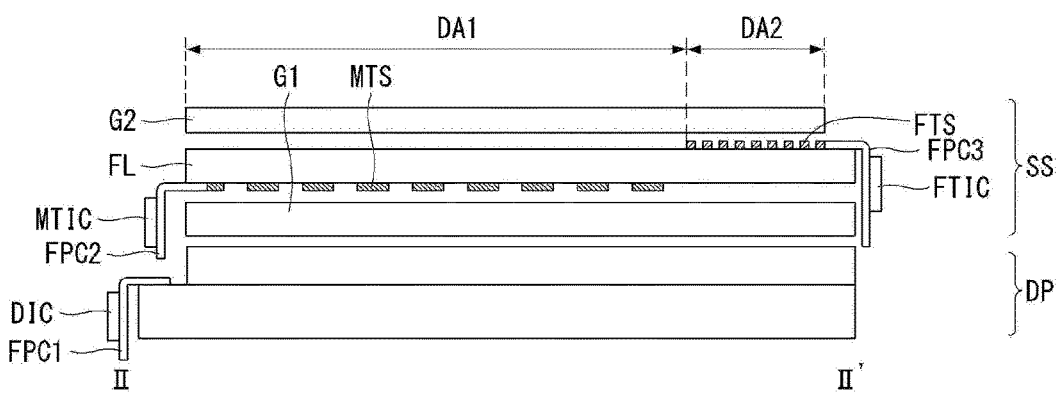
FIG. 9 is a cross-sectional view illustrating a fourth example of a second example embodiment taken along line II-II' of FIG. 5.

FIG. 5 is a plan view illustrating a display device including a sensor screen according to a second embodiment. FIG. 6 is a cross-sectional view illustrating a first example of the second embodiment taken along line II-II' of FIG. 5. FIG. 7 is a cross-sectional view illustrating a second example of the second embodiment taken along line II-II' of FIG. 5. FIG. 8 is a cross-sectional view illustrating a third example of the second embodiment taken along line II-II' of FIG. 5. FIG. 9 is a cross-sectional view illustrating a fourth example of the second embodiment taken along line II-II' of FIG. 5.

Referring to FIGS. 5 and 6, a display device including a sensor screen according to a first example of the second embodiment includes a display panel DP and a sensor screen SS disposed on the display panel DP.

The display panel DP includes a first display area DA1 and a second display area DA2 that are positioned adjacent to each other, and a module assembly MA in which a module such as a camera may be installed. A first flexible circuit board FPC1, on which a display IC DIC for a display drive is mounted, is attached to the outside of the first display area DA1.

The display panel DP may use a display panel of a flat panel display, such as a liquid crystal display (LCD), a field emission display (FED), a plasma display panel (PDP), an organic light emitting diode (OLED) display, and an electrophoresis display (EPD). Other display panels may be used.

The sensor screen SS includes a first transparent substrate G1 and a second transparent substrate G2 that are sequentially disposed on the display panel DP. The first and second transparent substrates G1 and G2 may be made of a transparent material, for example, tempered glass or hard-coated high-hardness plastic, etc.

On an upper surface of the first transparent substrate G1 opposite the second transparent substrate G2, first touch sensors MTS are disposed at a location corresponding to the first display area DA1 of the display panel DP, and fingerprint touch sensors FTS are disposed at a location corresponding to the second display area DA2 of the display panel DP.

In another embodiment, the first touch sensors MTS may be disposed on a lower surface of the second transparent substrate G2 corresponding to the first display area DA1 of the display panel DP, and the fingerprint touch sensors FTS may be disposed on the lower surface of the second transparent substrate G2 corresponding to the second display area DA2 of the display panel DP.

On the upper surface of the first transparent substrate G1 or the lower surface of the second transparent substrate G2, a second flexible circuit board FPC2, on which a touch IC MTIC for a touch recognition of the first display area DA1 of the display panel DP is mounted, is attached to the outside of the first display area DA1. In addition, on the upper surface of the first transparent substrate G1 or the lower surface of the second transparent substrate G2, a third flexible circuit board FPC3, on which a fingerprint touch IC FTIC for a touch recognition and a fingerprint recognition of the second display area DA2 of the display panel DP is mounted, is attached to the outside of the second display area DA2.

The first touch sensors MTS are connected to the touch IC MTIC, and the fingerprint touch sensors FTS are connected to the fingerprint touch IC FTIC.

The first and second transparent substrates G1 and G2 may be attached to each other using a transparent material having a good adhesive strength and durability, for example, an optical clear adhesive (OCA) or an optical clear resin (OCR). The first transparent substrate G1 and the display panel DP may also be attached to each other using the OCA or the OCR.

The first transparent substrate G1 may have a first thickness, and the second transparent substrate G2 may have a second thickness less than the first thickness. The second thickness of the second transparent substrate G2 may be set to several μm to about 0.3 mm. When the second thickness of the second transparent substrate G2 is less than several μm, rigidity of the second transparent substrate G2 may not be sufficiently secured. Hence, a fingerprint sensor formed under the second transparent substrate G2 may not be sufficiently protected. When the second thickness of the second transparent substrate G2 exceeds 0.3 mm, a fingerprint recognition rate may decrease.

Rigidity of the display panel DP when the two transparent substrates G1 and G2 are disposed on the display panel DP may further increase, compared to when one transparent substrate having the same thickness as a sum of the thicknesses of the two transparent substrates G1 and G2 is disposed on the display panel DP. Hence, the display panel DP can be protected from an external impact. Further, because the fingerprint sensor may be disposed between the two transparent substrates G1 and G2, the fingerprint sensor may be disposed closer to a finger touch position than when one transparent substrate is disposed. Hence, the fingerprint recognition rate can increase.

Configuration of the first touch sensor MTS and the fingerprint touch sensor FTS will be described in detail later with reference to FIGS. 10A to 12.

Referring to FIGS. 5 and 7, a display device including a sensor screen according to a second example of the second embodiment includes a display panel DP and a sensor screen SS disposed on the display panel DP.

The display panel DP includes a first display area DA1 and a second display area DA2 that are positioned adjacent to each other, and a module assembly MA in which a module such as a camera may be installed. A first flexible circuit board FPC1, on which a display IC DIC for a display drive is mounted, is attached to the outside of the first display area DA1.

The display panel DP may use a display panel of a flat panel display, such as a liquid crystal display (LCD), a field emission display (FED), a plasma display panel (PDP), an organic light emitting diode (OLED) display, and an electrophoresis display (EPD). Other display panels may be used.

The sensor screen SS includes a first transparent substrate G1 and a second transparent substrate G2 that are sequentially disposed on the display panel DP. The first and second transparent substrates G1 and G2 may be made of a transparent material, for example, tempered glass or hard-coated high-hardness plastic, etc.

On a lower surface of the first transparent substrate G1 opposite the second transparent substrate G2 or an upper surface of the display panel DP, first touch sensors MTS are disposed at a location corresponding to the first display area DA1 of the display panel DP. On an upper surface of the first transparent substrate G1 opposite the display panel DP or a lower surface of the second transparent substrate G2, fingerprint touch sensors FTS are disposed at a location corresponding to the second display area DA2 of the display panel DP. The first touch sensors MTS are connected to a touch IC MTIC, and the fingerprint touch sensors FTS are connected to a fingerprint touch IC FTIC.

On the lower surface of the first transparent substrate G1 or the upper surface of the display panel DP, a second flexible circuit board FPC2, on which the touch IC MTIC for a touch recognition of the first display area DA1 of the display panel DP is mounted, is attached to the outside of the first display area DA1. In addition, on the upper surface of the first transparent substrate G1 or the lower surface of the second transparent substrate G2, a third flexible circuit board FPC3, on which the fingerprint touch IC FTIC for a touch recognition and a fingerprint recognition of the second display area DA2 of the display panel DP is mounted, is attached to the outside of the second display area DA2.

The first touch sensors MTS are connected to the touch IC MTIC, and the fingerprint touch sensors FTS are connected to the fingerprint touch IC FTIC.

The first and second transparent substrates G1 and G2 may be attached to each other using a transparent material having a good adhesive strength and durability, for example, an optical clear adhesive (OCA) or an optical clear resin (OCR). The first transparent substrate G1 and the display panel DP may also be attached to each other using the OCA or the OCR.

The first transparent substrate G1 may have a first thickness, and the second transparent substrate G2 may have a second thickness less than the first thickness. The second thickness of the second transparent substrate G2 may be set to several μm to about 0.3 mm. When the second thickness of the second transparent substrate G2 is less than several μm, rigidity of the second transparent substrate G2 may not be sufficiently secured. Hence, a fingerprint sensor formed under the second transparent substrate G2 may not be sufficiently protected. When the second thickness of the second transparent substrate G2 exceeds 0.3 mm, a fingerprint recognition rate may decrease.

Rigidity of the display panel DP when the two transparent substrates G1 and G2 are disposed on the display panel DP may further increase, compared to when one transparent substrate having the same thickness as a sum of the thicknesses of the two transparent substrates G1 and G2 is disposed on the display panel DP. Hence, the display panel DP can be protected from an external impact. Further, because the fingerprint sensor may be disposed between the two transparent substrates G1 and G2, the fingerprint sensor may be disposed closer to a finger touch position than when one transparent substrate is disposed. Hence, the fingerprint recognition rate can increase.

Configuration of the first touch sensor MTS and the fingerprint touch sensor FTS will be described in detail later with reference to FIGS. 10A to 12.

Referring to FIGS. 5 and 8, a display device including a sensor screen according to a third example of the second embodiment includes a display panel DP and a sensor screen SS disposed on the display panel DP.

The display panel DP includes a first display area DA1 and a second display area DA2 that are positioned adjacent to each other, and a module assembly MA in which a module such as a camera may be installed. A first flexible circuit board FPC1, on which a display IC DIC for a display drive is mounted, is attached to the outside of the first display area DA1.

The display panel DP may use a display panel of a flat panel display, such as a liquid crystal display (LCD), a field emission display (FED), a plasma display panel (PDP), an organic light emitting diode (OLED) display, and an electrophoresis display (EPD). Other display panels may be used.

The sensor screen SS includes a first transparent substrate G1, a transparent film FL, and a second transparent substrate G2 that are sequentially disposed on the display panel DP. The first and second transparent substrates G1 and G2 may be made of a transparent material, for example, tempered glass or hard-coated high-hardness plastic, etc. The transparent film FL may be made of a plastic material.

On an upper surface of the transparent film FL opposite the second transparent substrate G2 or a lower surface of the second transparent substrate G2, first touch sensors MTS are disposed at a location corresponding to the first display area DA1 of the display panel DP. In addition, on the upper surface of the transparent film FL or the lower surface of the second transparent substrate G2, fingerprint touch sensors FTS are disposed at a location corresponding to the second display area DA2 of the display panel DP.

On the upper surface of the transparent film FL or the lower surface of the second transparent substrate G2, a second flexible circuit board FPC2, on which a touch IC MTIC for a touch recognition of the first display area DA1 of the display panel DP is mounted, is attached to the outside of the first display area DA1. In addition, on the upper surface of the transparent film FL or the lower surface of the second transparent substrate G2, a third flexible circuit board FPC3, on which a fingerprint touch IC FTIC for a touch recognition and a fingerprint recognition of the second display area DA2 of the display panel DP is mounted, is attached to the outside of the second display area DA2.

The first touch sensors MTS are connected to the touch IC MTIC, and the fingerprint touch sensors FTS are connected to the fingerprint touch IC FTIC.

The first and second transparent substrates G1 and G2 and the transparent film FL may be attached to each other using a transparent material having a good adhesive strength and durability, for example, an optical clear adhesive (OCA) or an optical clear resin (OCR). The first transparent substrate G1 and the display panel DP may also be attached to each other using the OCA or the OCR.

The first transparent substrate G1 may have a first thickness, the second transparent substrate G2 may have a second thickness less than the first thickness, and the transparent film FL may have a third thickness less than the second thickness. The second thickness of the second transparent substrate G2 may be set to several μm to about 0.3 mm. When the second thickness of the second transparent substrate G2 is less than several μm, rigidity of the second transparent substrate G2 may not be sufficiently secured. Hence, a fingerprint sensor formed under the second transparent substrate G2 may not be sufficiently protected. When the second thickness of the second transparent substrate G2 exceeds 0.3 mm, a fingerprint recognition rate may decrease.

Rigidity of the display panel DP when the two transparent substrates G1 and G2 and one transparent film FL are disposed on the display panel DP may further increase, compared to when one transparent substrate having the same thickness as a sum of the thicknesses of the two transparent substrates G1 and G2 and one transparent film FL is disposed on the display panel DP. Hence, the display panel DP can be protected from an external impact. Further, because the fingerprint sensor may be disposed under the first transparent substrate G1, the fingerprint sensor may be disposed closer to a finger touch position than when one transparent substrate is disposed. Hence, the fingerprint recognition rate can increase.

Configuration of the first touch sensor MTS and the fingerprint touch sensor FTS will be described in detail later with reference to FIGS. 10A to 12.

Referring to FIGS. 5 and 9, a display device including a sensor screen according to a fourth example of the second embodiment includes a display panel DP and a sensor screen SS disposed on the display panel DP.

The display panel DP includes a first display area DA1 and a second display area DA2 that are positioned adjacent to each other, and a module assembly MA in which a module such as a camera may be installed. A first flexible circuit board FPC1, on which a display IC DIC for a display drive is mounted, is attached to the outside of the first display area DA1.

The display panel DP may use a display panel of a flat panel display, such as a liquid crystal display (LCD), a field emission display (FED), a plasma display panel (PDP), an organic light emitting diode (OLED) display, and an electrophoresis display (EPD). Other display panels may be used.

The sensor screen SS includes a first transparent substrate G1, a transparent film FL, and a second transparent substrate G2 that are sequentially disposed on the display panel DP. The first and second transparent substrates G1 and G2 may be made of a transparent material, for example, tempered glass or hard-coated high-hardness plastic, etc. The transparent film FL may be made of a plastic material.

On a lower surface of the transparent film FL opposite the first transparent substrate G1 or an upper surface of the first transparent substrate G1, first touch sensors MTS are disposed at a location corresponding to the first display area DA1 of the display panel DP. In addition, on an upper surface of the transparent film FL opposite the second transparent substrate G2 or a lower surface of the second transparent substrate G2, fingerprint touch sensors FTS are disposed at a location corresponding to the second display area DA2 of the display panel DP.

On the lower surface of the transparent film FL or the upper surface of the first transparent substrate G1, a second flexible circuit board FPC2, on which a touch IC MTIC for a touch recognition of the first display area DA1 of the display panel DP is mounted, is attached to the outside of the first display area DA1. In addition, on the upper surface of the transparent film FL or the lower surface of the second transparent substrate G2, a third flexible circuit board FPC3, on which a fingerprint touch IC FTIC for a touch recognition and a fingerprint recognition of the second display area DA2 of the display panel DP is mounted, is attached to the outside of the second display area DA2.

The first touch sensors MTS are connected to the touch IC MTIC, and the fingerprint touch sensors FTS are connected to the fingerprint touch IC FTIC.

The first and second transparent substrates G1 and G2 and the transparent film FL may be attached to each other using a transparent material having a good adhesive strength and durability, for example, an optical clear adhesive (OCA) or an optical clear resin (OCR). The first transparent substrate G1 and the display panel DP may also be attached to each other using the OCA or the OCR.

The first transparent substrate G1 may have a first thickness, the second transparent substrate G2 may have a second thickness less than the first thickness, and the transparent film FL may have a third thickness less than the second thickness. The second thickness of the second transparent substrate G2 may be set to several µm to about 0.3 mm. When the second thickness of the second transparent substrate G2 is less than several µm, rigidity of the second transparent substrate G2 may not be sufficiently secured. Hence, a fingerprint sensor formed under the second transparent substrate G2 may not be sufficiently protected. When the second thickness of the second transparent substrate G2 exceeds 0.3 mm, a fingerprint recognition rate may decrease.

Rigidity of the display panel DP when the two transparent substrates G1 and G2 and one transparent film FL are disposed on the display panel DP may further increase, compared to when one transparent substrate having the same thickness as a sum of the thicknesses of the two transparent substrates G1 and G2 and one transparent film FL is disposed on the display panel DP. Hence, the display panel DP can be protected from an external impact. Further, because the fingerprint sensor may be disposed under the first transparent substrate G1, the fingerprint sensor may be disposed closer to a finger touch position than when one transparent substrate is disposed. Hence, the fingerprint recognition rate can increase.

Configuration of the first touch sensor MTS and the fingerprint touch sensor FTS is described in detail below with reference to FIGS. 10A to 12.

A first touch sensor MTS according to the second embodiment is described in detail below with reference to FIGS. 10A and 10B.

Figure 10A:
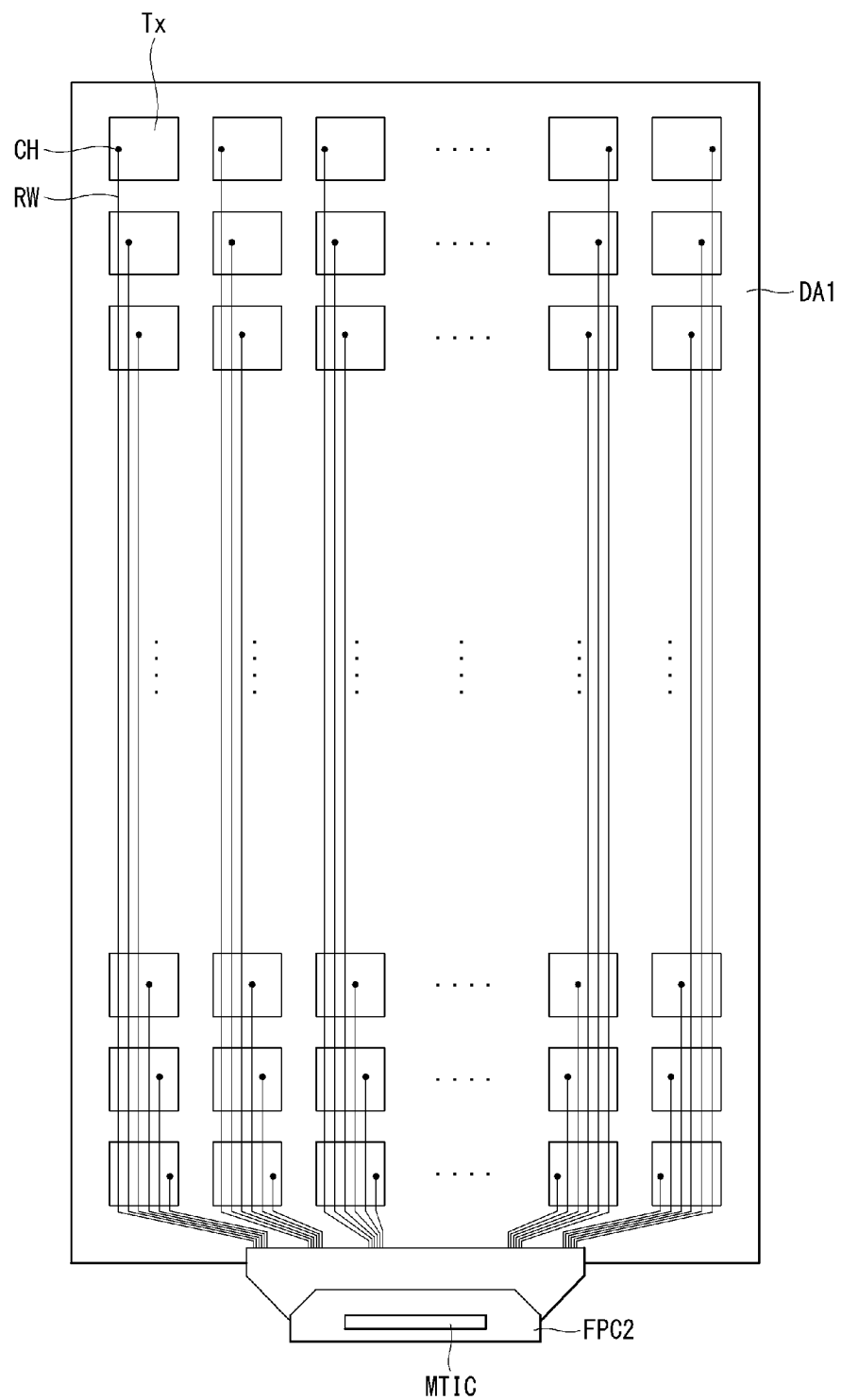
FIG. 10A is a plan view illustrating a first example of a first touch sensor shown in FIGS. 6 to 9.

FIG. 10A is a plan view illustrating a first example of a first touch sensor shown in FIGS. 6 to 9. FIG. 10B is a plan view illustrating a second example of a first touch sensor shown in FIGS. 6 to 9.

Referring to FIG. 10A, the first touch sensor MTS may be disposed on one of the upper surface or the lower surface of the first transparent substrate G1, the upper surface or the lower surface of the transparent film FL, the lower surface of the second transparent substrate G2, and the upper surface of the display panel DP at a location corresponding to the first display area DA1 of the display panel DP. The first touch sensor MTS includes a plurality of first touch electrodes Tx having the same size and a plurality of first routing wires RW respectively connected to the plurality of first touch electrodes Tx. An insulating layer (not shown) is disposed between the plurality of first touch electrodes Tx and the plurality of first routing wires RW, and each first routing wire RW is connected to each first touch electrode Tx through a contact hole CH formed in the insulating layer. The plurality of first routing wires RW supplies a touch driving voltage to the plurality of first touch electrodes Tx. When a touch input is performed on the first display area DA1 of the display panel DP, the plurality of first routing wires RW senses the plurality of first touch electrodes Tx and supplies a touch sensing signal to the touch IC MTIC mounted on the second flexible circuit board FPC2. The touch IC MTIC outputs the touch sensing signal with respect to the plurality of first touch electrodes Tx.

FIG. 10A illustrates that the first touch sensor MTS is implemented as a self-capacitive touch sensor that measures changes in a capacitance of each of first touch electrodes respectively connected to first routing wires and determines a touch position, by way of example. However, embodiments are not limited thereto. For example, the first touch sensor MTS may be implemented as a mutual capacitance touch sensor including first touch electrodes and second touch electrodes that intersect each other with an insulating layer interposed between them.

The first touch sensor MTS implemented as a mutual capacitance touch sensor is described below with reference to FIG. 10B.

Figure 10B:
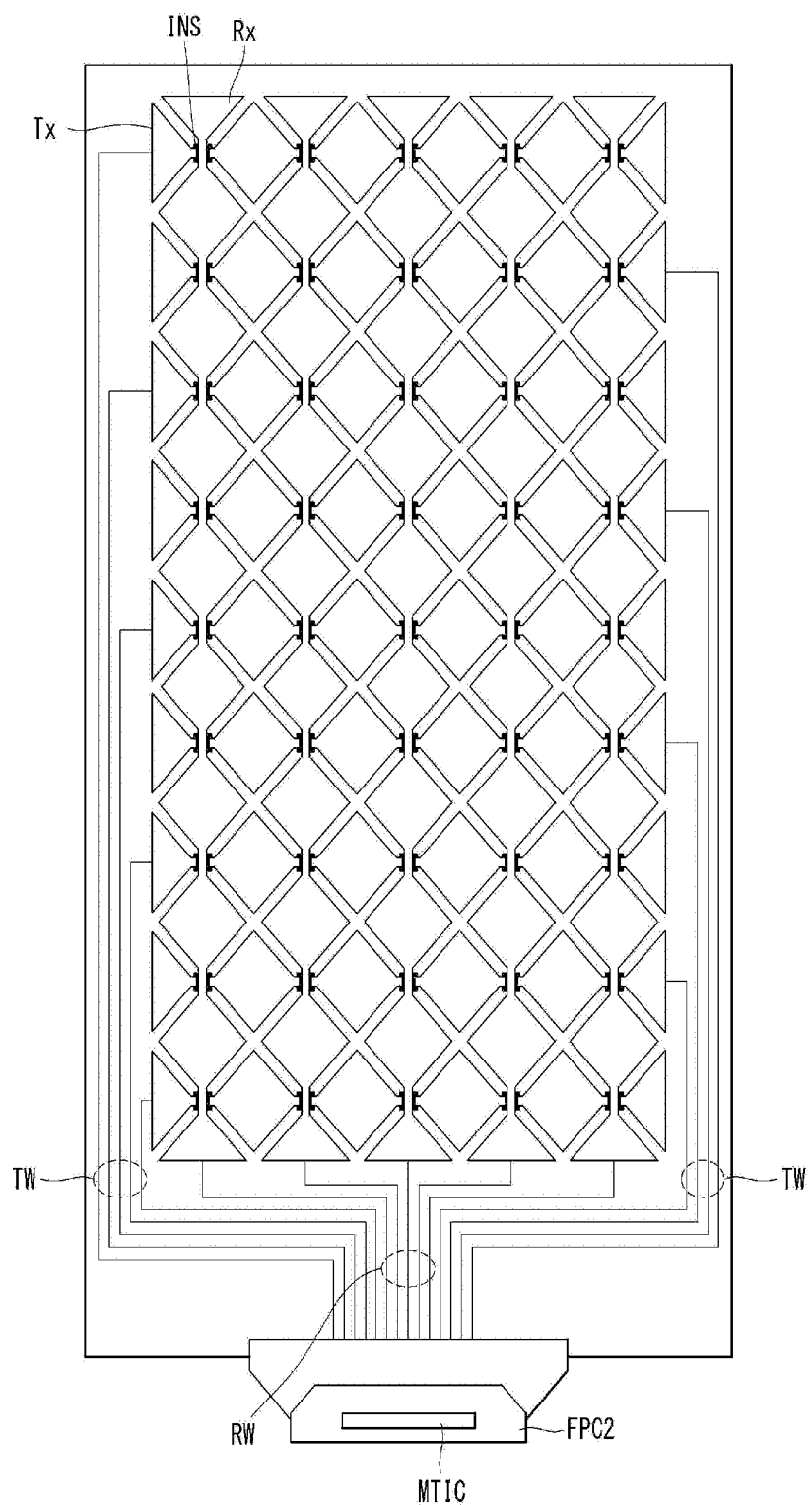
FIG. 10B is a plan view illustrating a second example of a first touch sensor shown in FIGS. 6 to 9.

Referring to FIG. 10B, the first touch sensor MTS may be disposed on one of the upper surface or the lower surface of the first transparent substrate G1, the upper surface or the lower surface of the transparent film FL, the lower surface of the second transparent substrate G2, and the upper surface of the display panel DP at a location corresponding to the first display area DA1 of the display panel DP.

The first touch sensor MTS includes a plurality of first touch electrodes Tx and a plurality of second touch electrodes Rx that are arranged to intersect each other, a plurality of first routing wires TW respectively connected to the plurality of first touch electrodes Tx, and a plurality of second routing wires RW respectively connected to the plurality of second touch electrodes Rx.

FIG. 10B illustrates that each of the first and second touch electrodes Tx and Rx has a rectangular electrode pattern, by way of example. However, embodiments are not limited thereto. For example, a triangle, a rhombus, a polygon, a circle, an oval, or a bar-shaped electrode pattern may be used for the first and second touch electrodes Tx and Rx.

An insulating pattern INS is disposed between intersections of the plurality of first touch electrodes Tx and the plurality of second touch electrodes Rx.

The plurality of first routing wires TW supplies a touch driving voltage to the plurality of first touch electrodes Tx. The plurality of second routing wires RW supplies a touch sensing signal, that is sensed at the plurality of second touch electrodes Rx, to the touch IC MTIC mounted on the second flexible circuit board FPC2. The touch IC MTIC outputs the touch sensing signal with respect to the plurality of second touch electrodes Rx. Next, the fingerprint touch sensor FTS according to the second embodiment is described in detail below with reference to FIGS. 11 and 12.

Figure 11:
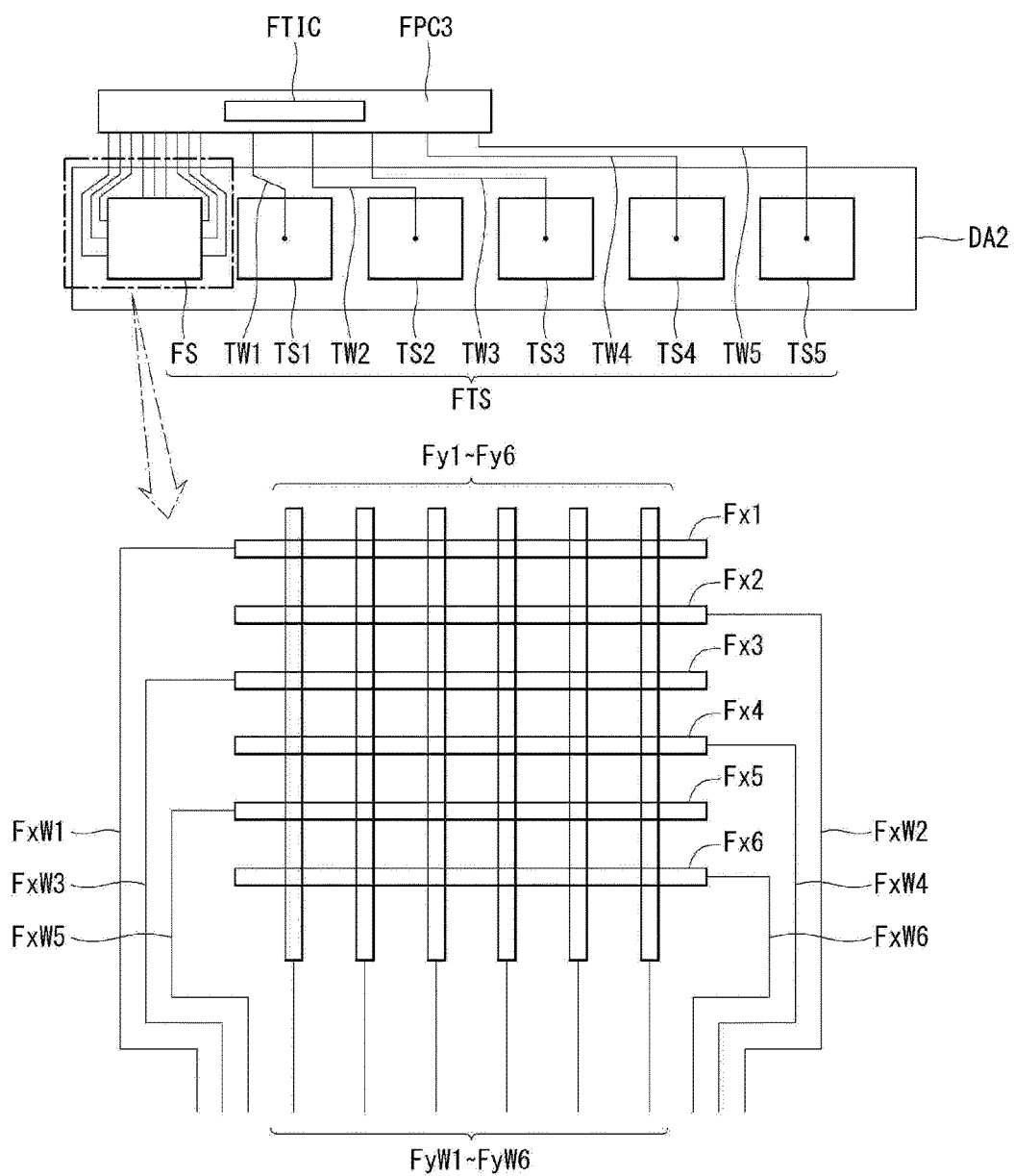
FIG. 11 is a plan view illustrating a first example of a fingerprint touch sensor shown in FIG. 4 and FIGS. 6 to 9.
Figure 12:
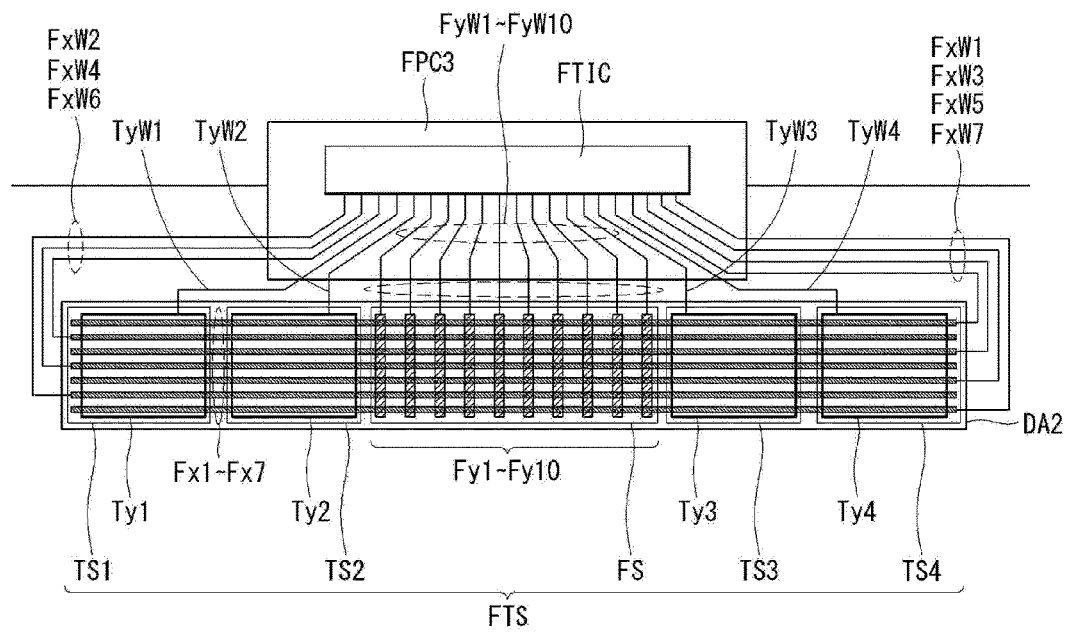
FIG. 12 is a plan view illustrating a second example of a fingerprint touch sensor shown in FIG. 4 and FIGS. 6 to 9.

FIG. 11 is a plan view illustrating a first example of a fingerprint touch sensor shown in FIG. 4 and FIGS. 6 to 9. FIG. 12 is a plan view illustrating a second example of a fingerprint touch sensor shown in FIG. 4 and FIGS. 6 to 9.

Referring to FIG. 11, the fingerprint touch sensor FTS includes a plurality of second touch sensors TS1 to TS5 and at least one fingerprint sensor FS. For example, FIG. 11 illustrates one fingerprint sensor FS.

Each of the plurality of second touch sensors TS1 to TS5 may be configured as a touch electrode having, for example, a rectangular shape. The plurality of second touch sensors TS1 to TS5 is connected to the fingerprint touch IC FTIC mounted on the third flexible circuit board FPC3 by second touch routing wires TW1 to TW5.

The fingerprint sensor FS includes a plurality of first fingerprint touch electrodes Fx1 to Fx6 and a plurality of second fingerprint touch electrodes Fy1 to Fy6 that are disposed to intersect each other. The plurality of first fingerprint touch electrodes Fx1 to Fx6 and the plurality of second fingerprint touch electrodes Fy1 to Fy6 are electrically insulated from each other by insulating patterns (not shown) or an insulating layer (not shown). The plurality of first fingerprint touch electrodes Fx1 to Fx6 is connected to the fingerprint touch IC FTIC mounted on the third flexible circuit board FPC3 by a plurality of first fingerprint routing wires FxW1 to FxW6. The plurality of second fingerprint touch electrodes Fy1 to Fy6 is connected to the fingerprint touch IC FTIC mounted on the third flexible circuit board FPC3 by a plurality of second fingerprint routing wires FyW1 to FyW6.

The fingerprint touch sensor FTS according to an example of FIG. 11 includes one fingerprint sensor and a plurality of touch sensors in a portion of the sensor screen SS corresponding to the second display area DA2 of the display panel DP, by way of example. Embodiments are not limited thereto. The fingerprint sensor and the touch sensor may be properly adjusted in position and number, if necessary or desired.

Referring to FIG. 12, the fingerprint touch sensor FTS includes a plurality of second touch sensors TS1 to TS4 and a fingerprint sensor FS.

The plurality of second touch sensors TS1 to TS4 includes a plurality of second touch electrodes Ty1 to Ty4 and a plurality of first fingerprint touch electrodes Fx1 to Fx7. The plurality of second touch electrodes Ty1 to Ty4 may have, for example, a rectangular shape and is arranged in a first direction (for example, x-axis direction). The plurality of first fingerprint touch electrodes Fx1 to Fx7 may have a bar shape, for example, a stripe shape. The plurality of first fingerprint touch electrodes Fx1 to Fx7 is arranged in the first direction to overlap the plurality of second touch electrodes Ty1 to Ty4 with an insulating layer interposed between them.

The fingerprint sensor FS includes a plurality of first fingerprint touch electrodes Fx1 to Fx7 and a plurality of second fingerprint touch electrodes Fy1 to Fy10 that intersect each other. The plurality of first fingerprint touch electrodes Fx1 to Fx7 is arranged in parallel with one another in the first direction. The plurality of second fingerprint touch electrodes Fy1 to Fy10 is arranged in parallel with one another in the second direction to intersect the plurality of first fingerprint touch electrodes Fx1 to Fx7.

The plurality of second touch electrodes Ty1 to Ty4 and the plurality of first fingerprint touch electrodes Fx1 to Fx7 are electrically insulated from each other by insulating patterns (not shown) or an insulating layer (not shown). The plurality of first fingerprint touch electrodes Fx1 to Fx7 and the plurality of second fingerprint touch electrodes Fy1 to Fy10 are electrically insulated from each other by insulating patterns (not shown) or an insulating layer (not shown).

The plurality of first fingerprint touch electrodes Fx1 to Fx7 is connected to the fingerprint touch IC FTIC mounted on the third flexible circuit board FPC3 by a plurality of first fingerprint routing wires FxW1 to FxW7. The plurality of second fingerprint touch electrodes Fy1 to Fy10 is connected to the fingerprint touch IC FTIC mounted on the third flexible circuit board FPC3 by a plurality of second fingerprint routing wires FyW1 to FyW10.

The plurality of first fingerprint touch electrodes Fx1 to Fx7 and the plurality of second fingerprint touch electrodes Fy1 to Fy10 may be made of a transparent conductive material, for example, indium tin oxide (ITO), indium zinc oxide (IZO), and gallium-doped zinc oxide (GZO).

The insulating layer or the insulating pattern may be formed using an inorganic insulating material, such as silicon oxide and silicon nitride, or a photosensitive organic insulating material, for example, PAC.

The second fingerprint touch electrodes Fy1 to Fy10 constituting the fingerprint sensor FS of the fingerprint touch sensor FTS are disposed only in a portion of the sensor screen SS corresponding to the second display area DA2, and the second touch electrodes Ty1 to Ty4 constituting the second touch sensors TS1 to TS4 of the fingerprint touch sensor FTS are disposed in a remaining portion of the sensor screen SS corresponding to the second display area DA2.

A pitch of the first fingerprint touch electrodes Fx1 to Fx7 and the second fingerprint touch electrodes Fy1 to Fy10 may be about 50 µm to 100 µm, and a width of each electrode may be about 5 µm to 50 µm.

Each of the second touch electrodes Ty1 to Ty4 may have a rectangular shape, of which a length of each side is about 3 to 5 mm. Unlike this, each of the second touch electrodes Ty1 to Ty4 may have the same pitch and the same length as the first fingerprint touch electrodes Fx1 to Fx7. In this instance, the routing wires respectively connected to the second touch electrodes Ty1 to Ty4 may be grouped and connected, thereby serving as a touch sensor.

In an example of FIG. 12, the odd-numbered first fingerprint routing wires FxW1, FxW3, FxW5, and FxW7 and the even-numbered first fingerprint routing wires FxW2, FxW4, and FxW6 are disposed on both sides of the second display area DA2 and are respectively connected to one ends of the odd-numbered first fingerprint touch electrodes Fx1, Fx3, Fx5, and Fx7 and the other ends of the even-numbered first fingerprint touch electrodes Fx2, Fx4, and Fx6. However, embodiments are not limited thereto. For example, all of the first fingerprint routing wires FxW1 to FxW7 may be disposed on one side of the second display area DA2 and may be respectively connected to one ends or the other ends of the first fingerprint touch electrodes Fx1 to Fx7. For example, some (e.g., FxW1 to FxW3) of the first fingerprint routing wires FxW1 to FxW7 may be respectively connected to one ends of some (e.g., Fx1 to Fx3) of the first fingerprint touch electrodes Fx1 to Fx7, and remaining first fingerprint routing wires (e.g., FxW4 to FxW7) may be respectively connected to the other ends of the remaining first fingerprint touch electrodes (e.g., Fx4 to Fx7).

The fingerprint touch IC FTIC supplies a driving pulse to the first fingerprint touch electrodes Fx1 to Fx7 and senses the second fingerprint touch electrodes Fy1 to Fy10 and the second touch electrodes Ty1 to Ty4, thereby sensing changes in a capacitance resulting from a touch input. Hence, when a touch input using a finger is performed on a formation area of the second touch electrodes Ty1 to Ty4, the fingerprint touch IC FTIC may recognize the touch input. Further, when a touch input using the finger is performed on a formation area of the second fingerprint touch electrodes Fy1 to Fy10, the fingerprint touch IC FTIC may sense changes in a capacitance between ridges and valleys of a fingerprint resulting from the touch input and thus may recognize the fingerprint of the user.

On the contrary, the fingerprint touch IC FTIC supplies a driving pulse to the second fingerprint touch electrodes Fy1 to Fy10 and the second touch electrodes Ty1 to Ty4 and senses the first fingerprint touch electrodes Fx1 to Fx7, thereby sensing changes in a capacitance resulting from a touch input. Hence, when a touch input using the finger is performed on the formation area of the second touch electrodes Ty1 to Ty4, the fingerprint touch IC FTIC may recognize the touch input. Further, when a touch input using the finger is performed on the formation area of the second fingerprint touch electrodes Fy1 to Fy10, the fingerprint touch IC FTIC may sense changes in a capacitance between ridges and valleys of a fingerprint resulting from the touch input and thus may recognize the fingerprint of the user.

The fingerprint recognition and the touch recognition in a formation area of the fingerprint sensor are described in detail below with reference to FIG. 13.

Figure 13:
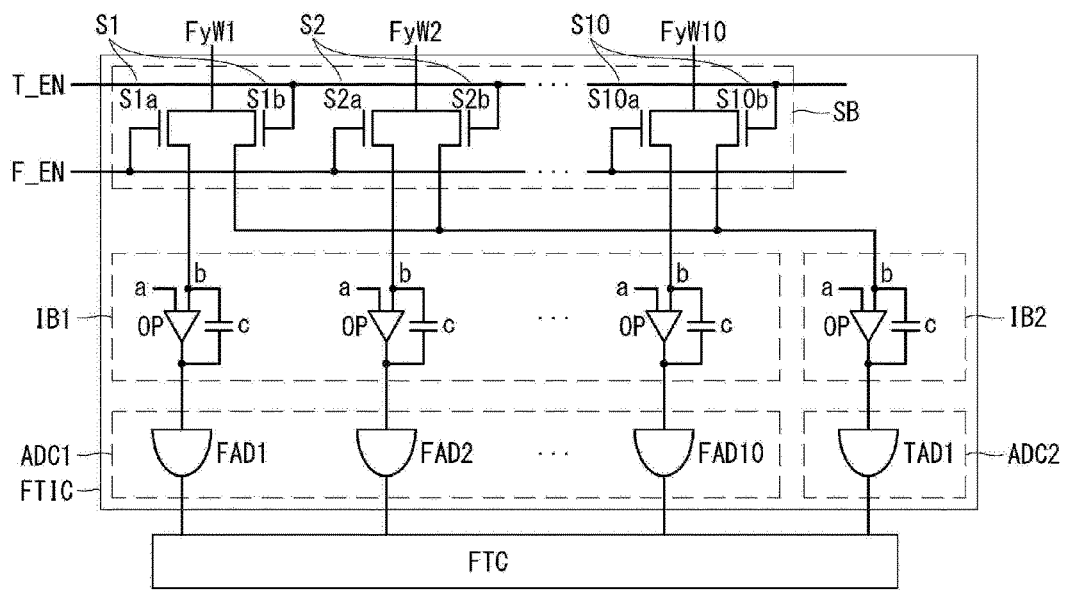
FIG. 13 is a block diagram schematically illustrating a partial configuration of a fingerprint touch IC connected to second fingerprint routing wires shown in FIG. 12.

FIG. 13 is a block diagram schematically illustrating a partial configuration of a fingerprint touch IC connected to second fingerprint routing wires shown in FIG. 12.

Referring to FIG. 13, the fingerprint touch IC FTIC includes a switching block SB, a first integration block IB1 connected to second fingerprint routing wires FyW1 to FyW10 through the switching block SB, a second integration block IB2 connected to one line, forming the second fingerprint routing wires FyW1 to FyW10 as a group, through the switching block SB, a first analog-to-digital converter ADC1 connected to an output unit of the first integration block IB1, and a second analog-to-digital converter ADC2 connected to an output unit of the second integration block IB2.

The switching block SB includes first to tenth switching elements S1 to S10.

The first to tenth switching elements S1 to S10 are controlled in response to a touch enable signal T_EN and a fingerprint enable signal F_EN having opposite polarities and supply sensing signals transmitted from the second fingerprint routing wires FyW1 to FyW10 to the first integration block IB1 or the second integration block IB2. For example, when switching elements S1$b$ to S10$b$ of the first to tenth switching elements S1 to S10 are turned on in response to the touch enable signal T_EN, the sensing signals transmitted from the second fingerprint routing wires FyW1 to FyW10 are integrated through one line and are supplied to a second integrator of the second integration block IB2. On the other hand, when switching elements S1$a$ to S10$a$ of the first to tenth switching elements S1 to S10 are turned on in response to the fingerprint enable signal F_EN, the sensing signals transmitted from the second fingerprint routing wires FyW1 to FyW10 are respectively supplied to integrators of the first integration block IB1.

The first integration block IB1 includes integrators that respectively integrate analog sensing voltages received from the second fingerprint routing wires FyW1 to FyW10 through the switching block SB. Each integrator of the first integration block IB1 includes an operational amplifier OP and a capacitor C. The operational amplifier OP includes two input terminals including a first input terminal "a" connected to a reference voltage source Vref and a second input terminal "b" connected to one of the second fingerprint routing wires FyW1 to FyW10, and an output terminal. The capacitor C is positioned between the second input terminal "b" and the output terminal of the operational amplifier OP and is connected in parallel to the operational amplifier OP.

The second integration block IB2 includes an integrator that integrates an integrated analog sensing voltage received from the second fingerprint routing wires FyW1 to FyW10 through the switching block SB. The integrator of the second integration block IB2 includes an operational amplifier OP and a capacitor C. The operational amplifier OP includes two input terminals including a first input terminal "a" connected to the reference voltage source Vref and a second input terminal "b" connected to a connection wire of the second fingerprint routing wires FyW1 to FyW10, and an output terminal. The capacitor C is positioned between the second input terminal "b" and the output terminal of the operational amplifier OP and is connected in parallel to the operational amplifier OP.

The first analog-to-digital converter ADC1 includes a plurality of fingerprint analog-to-digital converters FAD1 to FAD10 that converts analog data output from the integrators of the first integration block IB1 into digital data.

The second analog-to-digital converter ADC2 includes a touch analog-to-digital converter TAD that converts analog data output from the integrator of the second integration block IB2 into digital data.

In a touch drive, the fingerprint touch IC FTIC groups the second fingerprint touch electrodes Fy1 to Fy10 and supplies first digital data obtained by sensing the second fingerprint touch electrodes Fy1 to Fy10 to a fingerprint touch controller FTC. In a fingerprint drive, the fingerprint touch IC FTIC supplies second digital data obtained by sensing the second fingerprint touch electrodes Fy1 to Fy10 to the fingerprint touch controller FTC.

The fingerprint touch controller FTC analyses the first digital data supplied from the fingerprint touch IC FTIC using a known touch recognition algorithm to recognize a touch input. Further, the fingerprint touch controller FTC analyses the second digital data supplied from the fingerprint touch IC FTIC using a known fingerprint recognition algorithm to recognize a fingerprint input.

In the fingerprint touch sensor according to the embodiments, the touch electrodes are formed in an area other than a fingerprint sensing area, and the first fingerprint touch electrodes can be commonly used for the fingerprint sensing and the touch sensing. Thus, because both the fingerprint recognition and the touch recognition can be performed, the display device according to the embodiments can perform a multi-function.

Furthermore, because the fingerprint sensor is disposed in the display area, a fingerprint of the user can be sensed at an exact location of the fingerprint sensor displayed on the display area regardless of an environment, such as time (e.g., night) and place (e.g., dark place). Hence, the accuracy of the fingerprint sensing can increase.

The fingerprint touch sensor according to the embodiments includes one fingerprint sensor and a plurality of touch sensors at a location corresponding to the second display area of the display panel, by way of example. Embodiments are not limited thereto. The fingerprint sensor and the touch sensor may be properly adjusted in position and number, if necessary or desired.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a display panel, including a first touch sensor, defining a first display area and a second display area that are adjacent to each other, the first touch sensor being disposed in the first display area; and
a sensor screen including a first transparent substrate and a second transparent substrate that are sequentially disposed on the display panel, and a fingerprint sensor and a second touch sensor that are disposed between the first transparent substrate and the second transparent substrate at a location corresponding to the second display area of the display panel,
wherein the fingerprint sensor is configured to recognize a fingerprint and to detect touch input,
wherein the fingerprint sensor is disposed in a portion of the sensor screen corresponding to the second display area and is absent from an area corresponding to the first display area, and the second touch sensor is disposed in a remaining portion of the sensor screen corresponding to the second display area, and
wherein the fingerprint sensor includes a plurality of first fingerprint sensor lines and a plurality of second fingerprint sensor lines crossing each other, and the second touch sensor includes a plurality of second touch electrodes each overlapped with more than one of the first fingerprint sensor lines.

2. The display device of claim 1, wherein the first touch sensor is configured as one of a self-capacitive touch sensor and a mutual capacitance touch sensor using a common electrode of the display panel.

3. The display device of claim 1, wherein a thickness of the first transparent substrate is greater than a thickness of the second transparent substrate.

4. A display device, comprising:
a display panel including a first display area and a second display area that are adjacent to each other; and
a sensor screen including a first transparent substrate and a second transparent substrate that are sequentially disposed on the display panel, a first touch sensor disposed between the first transparent substrate and the second transparent substrate or between the first transparent substrate and the display panel at a location corresponding to the first display area of the display panel, and a fingerprint sensor and a second touch sensor that are disposed between the first transparent substrate and the second transparent substrate at a location corresponding to the second display area of the display panel,
wherein the fingerprint sensor is configured to recognize a fingerprint and to detect touch input,
wherein the fingerprint sensor is disposed in a portion of the sensor screen corresponding to the second display area and is absent from an area corresponding to the first display area, and the second touch sensor is disposed in a remaining portion of the sensor screen corresponding to the second display area, and
wherein the fingerprint sensor includes a plurality of first fingerprint sensor lines and a plurality of second fingerprint sensor lines crossing each other, and the second touch sensor includes a plurality of second touch electrodes each overlapped with more than one of the first fingerprint sensor lines.

5. The display device of claim 4, wherein a thickness of the first transparent substrate is greater than a thickness of the second transparent substrate.

6. A display device, comprising:
a display panel including a first display area and a second display area that are adjacent to each other; and
a sensor screen including:
a first transparent substrate, a transparent film, and a second transparent substrate that are sequentially disposed on the display panel;
a first touch sensor disposed between the second transparent substrate and the transparent film or between the transparent film and the first transparent substrate at a location corresponding to the first display area of the display panel; and
a fingerprint sensor and a second touch sensor that are disposed between the second transparent substrate and the transparent film at a location corresponding to the second display area of the display panel,
wherein the fingerprint sensor is configured to recognize a fingerprint and to detect touch input,
wherein the fingerprint sensor is disposed in a portion of the sensor screen corresponding to the second display area and is absent from an area corresponding to the first display area, and the second touch sensor is disposed in a remaining portion of the sensor screen corresponding to the second display area, and
wherein the fingerprint sensor includes a plurality of first fingerprint sensor lines and a plurality of second fingerprint sensor lines crossing each other, and the second touch sensor includes a plurality of second touch electrodes each overlapped with more than one of the first fingerprint sensor lines.

7. The display device of claim 6, wherein a thickness of the first transparent substrate is greater than a thickness of the second transparent substrate.

8. The display device of claim 6, wherein the fingerprint sensor includes a plurality of first fingerprint touch electrodes arranged in a first direction and a plurality of second fingerprint touch electrodes that is insulated from the plurality of first fingerprint touch electrodes and is arranged in a second direction crossing the first direction.

9. The display device of claim 8, wherein a second flexible circuit board, on which a touch integrated circuit connected to the first touch sensor is mounted, is disposed between the first transparent substrate and the transparent film, or the second transparent substrate and the transparent film corresponding to an outside of the first display area of the display panel, and wherein a third flexible circuit board, on which a fingerprint touch integrated circuit is mounted, is disposed between the second transparent substrate and the transparent film corresponding to an outside of the second display area of the display panel.

10. The display device of claim 9, wherein the fingerprint touch integrated circuit includes:
   a switching block including a plurality of switching elements that is controlled in response to a touch enable signal and a fingerprint enable signal having opposite polarities and outputs a plurality of sensing signals transmitted from the plurality of second fingerprint touch electrodes or outputs an integrated sensing signal of the plurality of sensing signals;
   a first integration block including first integrators that receive the plurality of sensing signals supplied from the switching block;
   a second integration block including a second integrator that receives the integrated sensing signal supplied from the switching block;
   a first analog-to-digital converter including fingerprint analog-to-digital converters that receive outputs of the first integrators and perform an analog-to-digital conversion on the outputs; and
   a second analog-to-digital converter including a touch analog-to-digital converter that receives an output of the second integrator and performs an analog-to-digital conversion on the output.

11. The display device of claim 10, wherein the fingerprint touch integrated circuit supplies a driving voltage for a touch recognition and a fingerprint recognition to the plurality of first fingerprint touch electrodes, and
   wherein the fingerprint touch integrated circuit senses the plurality of second fingerprint touch electrodes and recognizes a touch input and a fingerprint input.

12. A display device, comprising:
   a display panel, including a first touch sensor, defining a first display area and a second display area that are adjacent to each other, the first touch sensor being disposed in the first display area; and
   a sensor screen including a first transparent substrate disposed on the display panel, and a fingerprint sensor and a second touch sensor that are disposed on the first transparent substrate at a location corresponding to the second display area of the display panel,
   wherein the fingerprint sensor is configured to recognize a fingerprint and to detect touch input,
   wherein the fingerprint sensor is disposed in a portion of the sensor screen corresponding to the second display area and is absent from an area corresponding to the first display area, and the second touch sensor is disposed in a remaining portion of the sensor screen corresponding to the second display area, and
   wherein the fingerprint sensor includes a plurality of first fingerprint sensor lines and a plurality of second fingerprint sensor lines crossing each other, and the second touch sensor includes a plurality of second touch electrodes each overlapped with more than one of the first fingerprint sensor lines.

13. The display device of claim 12, further comprising a second transparent substrate disposed on the first transparent substrate,
   wherein the fingerprint sensor and the second touch sensor are disposed between the first transparent substrate and the second transparent substrate.

14. The display device of claim 12, wherein the fingerprint sensor includes a plurality of first fingerprint touch electrodes arranged in a first direction and a plurality of second fingerprint touch electrodes that is insulated from the plurality of first fingerprint touch electrodes and is arranged in a second direction crossing the first direction.

15. The display device of claim 14, wherein a second flexible circuit board, on which a touch integrated circuit connected to the first touch sensor is mounted, is disposed between the first transparent substrate and the second transparent substrate, or the first transparent substrate and the display panel corresponding to an outside of the first display area of the display panel, and
   wherein a third flexible circuit board, on which a fingerprint touch integrated circuit is mounted, is disposed between the first transparent substrate and the second transparent substrate corresponding to an outside of the second display area of the display panel.

16. The display device of claim 15, wherein the fingerprint touch integrated circuit includes:
   a switching block including a plurality of switching elements that is controlled in response to a touch enable signal and a fingerprint enable signal having opposite polarities and outputs a plurality of sensing signals transmitted from the plurality of second fingerprint touch electrodes or outputs an integrated sensing signal of the plurality of sensing signals;
   a first integration block including first integrators that receive the plurality of sensing signals supplied from the switching block;
   a second integration block including a second integrator that receives the integrated sensing signal supplied from the switching block;
   a first analog-to-digital converter including fingerprint analog-to-digital converters that receive outputs of the first integrators and perform an analog-to-digital conversion on the outputs; and
   a second analog-to-digital including a touch analog-to-digital converter that receives an output of the second integrator and performs an analog-to-digital conversion on the output.

* * * * *